United States Patent
Addy

(10) Patent No.: US 11,125,191 B2
(45) Date of Patent: Sep. 21, 2021

(54) ENGINE INTAKE APPARATUS AND METHOD

(71) Applicant: Oval Engine LTD, London (GB)

(72) Inventor: Shaun Addy, Lichfield (GB)

(73) Assignee: Oval Engine LTD, London (GB)

( * ) Notice: Subject to any disclaimer, the term of this patent is extended or adjusted under 35 U.S.C. 154(b) by 631 days.

(21) Appl. No.: 14/363,187

(22) PCT Filed: Dec. 6, 2012

(86) PCT No.: PCT/GB2012/053046
§ 371 (c)(1),
(2) Date: Jun. 5, 2014

(87) PCT Pub. No.: WO2013/083995
PCT Pub. Date: Jun. 13, 2013

(65) Prior Publication Data
US 2014/0345568 A1   Nov. 27, 2014

(30) Foreign Application Priority Data

Dec. 6, 2011 (GB) .................................... 1120970

(51) Int. Cl.
*F02M 31/04* (2006.01)
*F02M 35/10* (2006.01)
*F02M 69/04* (2006.01)

(52) U.S. Cl.
CPC ........ *F02M 31/045* (2013.01); *F02M 31/042* (2013.01); *F02M 35/10216* (2013.01); *F02M 69/042* (2013.01); *Y02T 10/12* (2013.01)

(58) Field of Classification Search
CPC .......... F02M 31/042; F02M 35/10216; F02M 69/042; Y02T 10/126
(Continued)

(56) References Cited

U.S. PATENT DOCUMENTS 3,601,183 A   8/1971   Lohner et al.
3,782,639 A   1/1974   Boltz et al.
(Continued)

FOREIGN PATENT DOCUMENTS

DE   3523892   1/1987
DE   3841937   6/1990
(Continued)

OTHER PUBLICATIONS

International Search Report for corresponding PCT application No. PCT/GB2012/053046, dated Apr. 24, 2013, 3 pages.
(Continued)

*Primary Examiner* — Lindsay M Low
*Assistant Examiner* — Omar Morales
(74) *Attorney, Agent, or Firm* — Myers Bigel, P.A.

(57) ABSTRACT

Intake apparatus for an engine that includes an injector for injecting fuel into a flowstream of intake gas through the apparatus and a heater for heating intake gas passing through the apparatus. The apparatus being operable to inject fuel into the flowstream of intake gas by means of the injector such that when intake gas flows through the apparatus at a first flow rate injected fuel impinges on the heater; and when intake gas flows through the apparatus at a second flow rate greater than the first a flowpath of injected fuel is deflected by intake gas such that substantially no fuel impinges on the heater.

21 Claims, 6 Drawing Sheets

(58) Field of Classification Search
USPC .......................................................... 123/445
See application file for complete search history.

(56) References Cited

U.S. PATENT DOCUMENTS

| | | | |
|---|---|---|---|
| 3,930,477 A | 1/1976 | Jordan | |
| 4,303,050 A | 12/1981 | Platzer, Jr. | |
| 4,341,193 A | 7/1982 | Bowler | |
| 4,436,071 A | 3/1984 | Hafner et al. | |
| 4,753,205 A | 6/1988 | Knapp et al. | |
| 4,905,651 A | 3/1990 | Bonfiglioli et al. | |
| 5,007,402 A | 4/1991 | Scherenberg | |
| 5,048,500 A * | 9/1991 | Curhan | F02M 31/135 123/470 |
| 5,078,115 A * | 1/1992 | Yamashita | F02M 31/135 123/549 |
| 5,086,747 A | 2/1992 | Curhan | |
| 5,119,794 A * | 6/1992 | Kushida | F02M 31/135 123/543 |
| 5,156,124 A | 10/1992 | Sugimoto et al. | |
| 5,179,927 A | 1/1993 | Henke et al. | |
| 5,297,530 A | 3/1994 | Kaneko et al. | |
| 5,438,969 A | 8/1995 | Kurr et al. | |
| 5,685,280 A | 11/1997 | Krauss et al. | |
| 5,878,726 A * | 3/1999 | Takahashi | F02B 61/045 123/195 P |
| 6,027,049 A | 2/2000 | Stier | |
| 6,039,029 A * | 3/2000 | Nagasaka | F02B 31/087 123/336 |
| 6,606,976 B2 * | 8/2003 | Nagano | F02D 41/0255 123/431 |
| 7,263,970 B2 | 9/2007 | Ishida et al. | |
| 2001/0027776 A1 * | 10/2001 | Amou | F02M 35/10216 123/478 |
| 2003/0155666 A1 | 8/2003 | Amou et al. | |
| 2003/0213460 A1 | 11/2003 | Schwam | |
| 2003/0217739 A1 | 11/2003 | Saeki et al. | |
| 2006/0162691 A1 | 7/2006 | Ishida et al. | |
| 2007/0197157 A1 * | 8/2007 | Bellinger | F02B 29/0418 454/155 |
| 2009/0320808 A1 * | 12/2009 | Albert | F16K 49/002 123/556 |

FOREIGN PATENT DOCUMENTS

| | | |
|---|---|---|
| DE | 4424117 | 1/1995 |
| EP | 2820290 B1 | 4/2017 |
| FR | 631733 | 12/1927 |
| GB | 2291119 | 1/1996 |
| GB | 2497319 B | 11/2013 |
| JP | 56072232 | 6/1981 |
| JP | 61006667 | 1/1986 |
| JP | S61145867 | 9/1986 |
| JP | 5079414 | 3/1991 |
| JP | 6042417 | 7/1992 |
| JP | 2006099968 | 4/2006 |
| JP | 2008133786 | 6/2008 |
| JP | 2008133786 A * | 6/2008 |
| WO | WO1993/002284 | 2/1993 |
| WO | WO2009/130504 | 10/2009 |
| WO | WO2010/043915 | 4/2010 |
| WO | WO2011/138602 | 11/2011 |

OTHER PUBLICATIONS

International Search Report for PCT application No. PCT/GB2009/050403, dated Jul. 22, 2009, 3 pages.
International Search Report for PCT application No. PCT/GB2009/051402, dated May 19, 2010, 7 pages.

* cited by examiner

ENGINE INTAKE APPARATUS AND METHOD

RELATED APPLICATION

This application is a 35 USC§ 371 national phase application of PCT/GB2012/053046, filed Dec. 6, 2012, which claims the benefit of and priority to GB Application No. 1120970.7 filed Dec. 6, 2011.

FIELD OF THE INVENTION

The present invention relates to intake apparatus and to a method of delivering a fuel/gas mixture to an engine. In particular but not exclusively the invention relates to intake apparatus and a method for improving starting of an internal combustion engine.

BACKGROUND

It is known to provide fuel injection apparatus for an internal combustion engine in which fuel is injected by means of an injector into a flow of intake air in order to form a fuel/air mixture. To aid starting of the engine from cold the intake air may be heated.

The intake air may be heated before fuel is injected into the flow of air. Alternatively the mixture of fuel and air may be heated.

In some known embodiments fuel is injected by an injector into a flowstream of intake air and is carried by the flow stream past a heater downstream of the injector. FIG. 1 illustrates such an arrangement in a known engine intake apparatus 1.

The apparatus 1 has a fuel injector 30 that is arranged to inject fuel into a conduit 10 that is arranged to deliver a fuel/air mixture into an inlet port of a combustion chamber of an engine 5. A heater element 40 is provided in the conduit 10 downstream of the injector 30 to heat air and fuel in order to aid starting and initial running of the engine 5. An angle θ between a cylinder axis CA of the conduit 10 and a direction in which the injector 30 initially directs fuel into the conduit 10 is set to be around 30° in the example shown.

As shown in FIG. 1 fuel injected into the conduit 10 is carried in a flowstream of intake air through the conduit 10 in the direction of arrow $F_G$. The fuel mixes with the air to form a fuel/air mixture which flows past the element 40. The mixture is thereby heated. When the engine 5 has warmed to a temperature at which heating of the fuel/air mixture is no longer required, the heater element 40 is switched off.

The present inventors have recognised that a problem with such arrangements is that fuel can condense on the heater element 40 when the heater element 40 is switched off. The fuel subsequently detaches from the heater element 40 in droplets causing uneven (or 'rough') running of the engine.

It is an aim of embodiments of the present invention to at least partially mitigate the disadvantages of known fuel injection apparatus.

STATEMENT OF THE INVENTION

Aspects of the invention may be understood by reference to the appended claims.

In an aspect of the invention for which protection is sought there is provided intake apparatus for an engine comprising:

injection means for injecting fuel into a flowstream of intake gas through the apparatus; and
heating means for heating intake gas passing through the apparatus,
the apparatus being operable to inject fuel into the flowstream of intake gas by means of the injection means such that when intake gas flows through the apparatus at a first flow rate injected fuel impinges on the heating means; and
when intake gas flows through the apparatus at a second flow rate greater than the first a flowpath of injected fuel is deflected by intake gas such that substantially no fuel impinges on the heating means.

It is to be understood that the fuel may vaporise as it is injected into the flowstream to form a gas/fuel mixture.

In a further aspect of the invention for which protection is sought there is provided a method of delivering a fuel and intake gas to an engine comprising:

injecting fuel into a flowstream of intake gas through engine intake apparatus; and
heating by heating means intake gas passing through the apparatus,
the method comprising injecting fuel into a flowstream of intake gas flowing at a first flow rate whereby the injected fuel impinges on the heating means; and
injecting fuel into the flowstream of intake gas flowing at a second flow rate greater than the first whereby the injected fuel is deflected by the flowstream of intake gas whereby substantially no fuel impinges on the heating means.

The method may comprise heating the intake gas by means of the heating means when the engine is being started whereby the flow of intake gas is such that the injected fuel impinges on the heating means, and subsequently terminating heating of the intake gas.

The method may comprise increasing a flow rate of intake gas through the apparatus after starting the engine such that a flow rate of intake gas is sufficiently high to prevent impingement of injected fuel on the heating means.

In an aspect of the invention for which protection is sought there is provided intake apparatus for an engine comprising:

injection means for injecting fuel into a flowstream of intake gas through the apparatus; and
heating means for heating intake gas passing through the apparatus,
the apparatus being operable to inject fuel into the flowstream of intake gas by means of the injection means such that when intake gas flows at a certain flow rate injected fuel impinges on the heating means; and
when intake gas flows through the apparatus at a greater flow rate a flowpath of injected fuel is deflected by intake gas such that substantially no fuel impinges on the heating means.

In a further aspect of the invention for which protection is sought there is provided a method of delivering a fuel and intake gas to an engine comprising:

injecting fuel into a flowstream of intake gas through engine intake apparatus; and
heating by heating means intake gas passing through the apparatus,
the method comprising injecting fuel into a flowstream of intake gas flowing at a rate whereby the injected fuel impinges on the heating means; and
increasing the flow rate of intake gas whereby the injected fuel is deflected by the flowstream of intake gas whereby substantially no fuel impinges on the heating means.

In one aspect of the invention there is provided intake apparatus for an engine comprising:

an intake conduit through which intake gas may flow into a combustion chamber of the engine;

heating means for heating intake gas passing through the conduit; and injection means for injecting fuel into the conduit, the injection means being operable to inject fuel into the conduit in a direction such that when intake gas is flowing through the conduit at a first flow rate a trajectory of fuel is such that fuel is incident on the heating means and when intake gas is flowing through the conduit at a second flow rate different from the first flow rate the trajectory of fuel is modified by the flow of intake gas such that fuel is not incident on the heating means.

Embodiments of the invention have the advantage that impingement of fuel on the heating means may be arranged only to occur at relatively low flow rates, for example a flow rate corresponding to an idle speed of the engine. Thus, when the engine is operating at a power setting higher than that corresponding to idle speed the intake apparatus is arranged to prevent impingement of fuel on the heating means.

It is to be understood that if fuel impinges on the heating means when the heating means is not activated (heated), the fuel may condense on the heating means. This is undesirable since the fuel may subsequently detach from the heating means and cause a deviation of engine performance from a required performance, for example performance in respect of engine speed and/or power developed by the engine.

In many applications it is generally considered important that an engine respond quickly to control inputs from an operator and maintain a steady speed of rotation for a given flow rate of intake gas (and/or fuel). If fuel condenses on the heating means and subsequently detaches, a delay in delivery of fuel to a combustion chamber of the engine occurs. Thus the engine is less responsive to control inputs from the operator (which may be a person or an electronic controller). Furthermore if condensed fuel detaches from the heating means in droplets, uneven (or 'rough') running of the engine may result.

The present inventor has recognised the problems associated with known intake apparatus. Embodiments of the present invention seek to overcome one or more of these problems by allowing impingement of fuel on the heating means when intake gas flows at the first flow rate and not when it flows at the second flow rate (for example a rate which is higher than the first flow rate). The first flow rate may correspond to an idle speed of the engine and may be a flow rate that would be experienced under conditions in which the heating means would be switched on (for example when the engine is initially started and idling), and not when delivering power levels normally required of the engine when in service. The second flow rate may correspond to a flow rate expected when the engine is developing power levels that it is designed to develop in normal use (or normal service). In the case of an aircraft engine this may correspond to a cruise engine power or speed setting. Such a flow rate may be referred to as a cruise engine speed air flow rate.

Advantageously the second flow rate may be greater than the first flow rate.

Further advantageously the injection means may be arranged to inject fuel into the conduit in a direction towards the heating means.

Thus the injection means may be directed such that in the absence of a flow of intake gas fuel is injected towards the heating means. Thus in the absence of a flow of intake gas, fuel will impinge on the heating means.

The injection means may be arranged to inject fuel into the conduit in a direction upstream of the heating means with respect to a flow of intake gas through the conduit and not directly towards the heating means.

By upstream of the heating means is meant upstream with respect to the normal intake gas flow direction.

Thus in the absence of a flow of intake gas fuel may be injected in a direction upstream of the heating means and not towards the heating means.

It is to be understood therefore that in the absence of a flow of intake gas the injected fuel may fail to impinge directly on the heating means whereas when intake gas flows at the first flow rate the fuel does impinge on the heating means.

If intake gas flows at the second flow rate and the second flow rate is higher than the first, the fuel may be deflected in the flow stream of intake gas such that it fails to reach the heating means.

Advantageously at least a portion of the heating means is provided at a location displaced outwardly from the conduit, for example outwardly from an internal wall of the conduit, optionally radially outwardly.

By radially outwardly is meant a location displaced further from a longitudinal axis of the conduit than a corresponding portion of an interior wall of the conduit at the location of the heating means. Thus the heating means has at least a portion that is located out of a flowpath of intake gas when intake gas is flowing through the conduit.

Further advantageously the heating means is substantially entirely provided at a location displaced outwardly from the flowstream of intake gas through the conduit.

Optionally the injector is arranged to inject fuel into the conduit from a location displaced outwardly from of an interior wall of the conduit.

The heating means may be provided in a cavity, recess of like feature provided in or at a wall of the conduit.

Optionally the heating means is provided in an auxiliary intake passage coupled to the intake conduit, the apparatus being operable to provide a flow of auxiliary intake gas through the auxiliary intake passage to the intake conduit.

Advantageously the auxiliary intake passage is provided with valve means upstream of the heating means operable to control a flow rate of intake gas through the auxiliary passage.

Optionally the apparatus is arranged wherein auxiliary intake gas comprises gas drawn from the intake conduit.

Alternatively the apparatus may be arranged wherein auxiliary intake gas may comprise gas drawn from an external intake gas supply.

The external intake gas supply may for example be an ambient atmosphere, a gas storage tank or any other suitable supply.

Advantageously the apparatus may comprise control means operable to activate the heating means and provide a flow of intake gas through the conduit when it is required to start an engine.

Alternatively or in addition the control means may be operable to activate the heating means and provide a flow of auxiliary intake gas through the auxiliary intake passage when it is required to start an engine.

The control means may be further operable to switch off the heating means when an engine has been started.

Advantageously the control means is operable to switch off the heating means when an engine has been started and at least one further condition is met selected from the conditions that an engine has been running for a prescribed period of time following starting and an engine has achieved a prescribed operating temperature.

An engine operating temperature may be determined for example by reference to an engine coolant temperature, an engine component temperature or by any other suitable means.

Optionally the injection means is arranged to inject fuel into the conduit in a direction substantially upstream of the direction of flow of intake gas.

Alternatively the injection means may be operable to inject fuel into the conduit in a direction substantially downstream of a direction of flow of intake gas.

The injection means may be arranged to inject fuel into the conduit in a direction substantially parallel to a direction of flow of intake gas.

Still further alternatively the injection means may be operable to inject fuel into the conduit in a direction substantially normal to a direction of flow of intake gas.

The heating means may comprise one or more heating elements provided in a flowpath of intake gas through the conduit.

Advantageously the heating means may comprise a plurality of heating elements provided in the flowpath of intake gas.

Advantageously the injection means may be operable to inject fuel into the conduit in a direction such that when intake gas is flowing through the conduit at a rate less than or substantially equal to the first flow rate the fuel impinges upon at least a portion of the heating means.

Further advantageously the injection means is operable to inject fuel into the conduit in a direction such that when intake gas is flowing through the conduit at a rate greater than or substantially equal to the second flow rate the fuel does not impinge upon the heating means.

In an aspect of the invention there is provided an engine comprising intake apparatus according to the preceding aspect.

In a further aspect of the invention there is provided a method of delivering a fuel and intake gas to an engine comprising:
  passing or establishing a flow of gas along an intake conduit into a combustion chamber of an engine;
  injecting fuel into the conduit by means of injection means whereby when intake gas is flowing through the conduit at a first flow rate a trajectory of fuel is such that fuel impinges on the heating means and when intake gas is flowing through the conduit at a second flow rate different from the first flow rate the trajectory of fuel is modified by the flow of intake gas such that fuel does not impinge on the heating means.

Advantageously the method comprises the step of heating by means of the heating means fuel and gas flowing therepast when intake gas flows through the conduit at the first flow rate.

In another aspect of the invention there is provided intake apparatus for an engine comprising:
  an intake conduit through which intake gas may flow into a combustion chamber of the engine;
  heating means for heating intake gas passing through the conduit; and
  injection means for injecting fuel into the conduit,
  wherein the injection means is arranged to inject fuel into the conduit in a direction towards the heating means, being a direction having at least a component that is against the direction of flow of gas through the conduit.

Some embodiments of the invention have the advantage that a distance travelled by fuel injected by the injection means in the upstream direction will be dependent on the flow rate of gas through the conduit.

In an aspect of the invention there is provided a method of injecting fuel into an internal combustion engine comprising: passing or establishing a flow of intake gas through an intake conduit and into the engine; heating the gas by means of heating means as it passes through the conduit; and injecting fuel into the conduit by means of injection means, whereby the step of injecting fuel into the conduit comprises injecting fuel in a direction towards the heating means and in a direction having at least a component that is against the direction of flow of gas through the conduit.

In one aspect of the invention there is provided intake apparatus for an engine comprising:
  an intake conduit through which intake gas may flow into a combustion chamber of the engine;
  heating means for heating intake gas passing through the conduit; and injection means for injecting fuel into the conduit,
  the injection means being operable to inject fuel into the conduit in a direction such that when intake gas is flowing through the conduit at a first flow rate the fuel flows past at least a portion of the heating means and when intake gas is flowing through the conduit at a second flow rate different from the first flow rate fuel does not flow past the heating means.

BRIEF DESCRIPTION OF THE DRAWINGS

Embodiments of the invention will now be described with reference to the accompanying figures in which.

DETAILED DESCRIPTION

Figure 2:
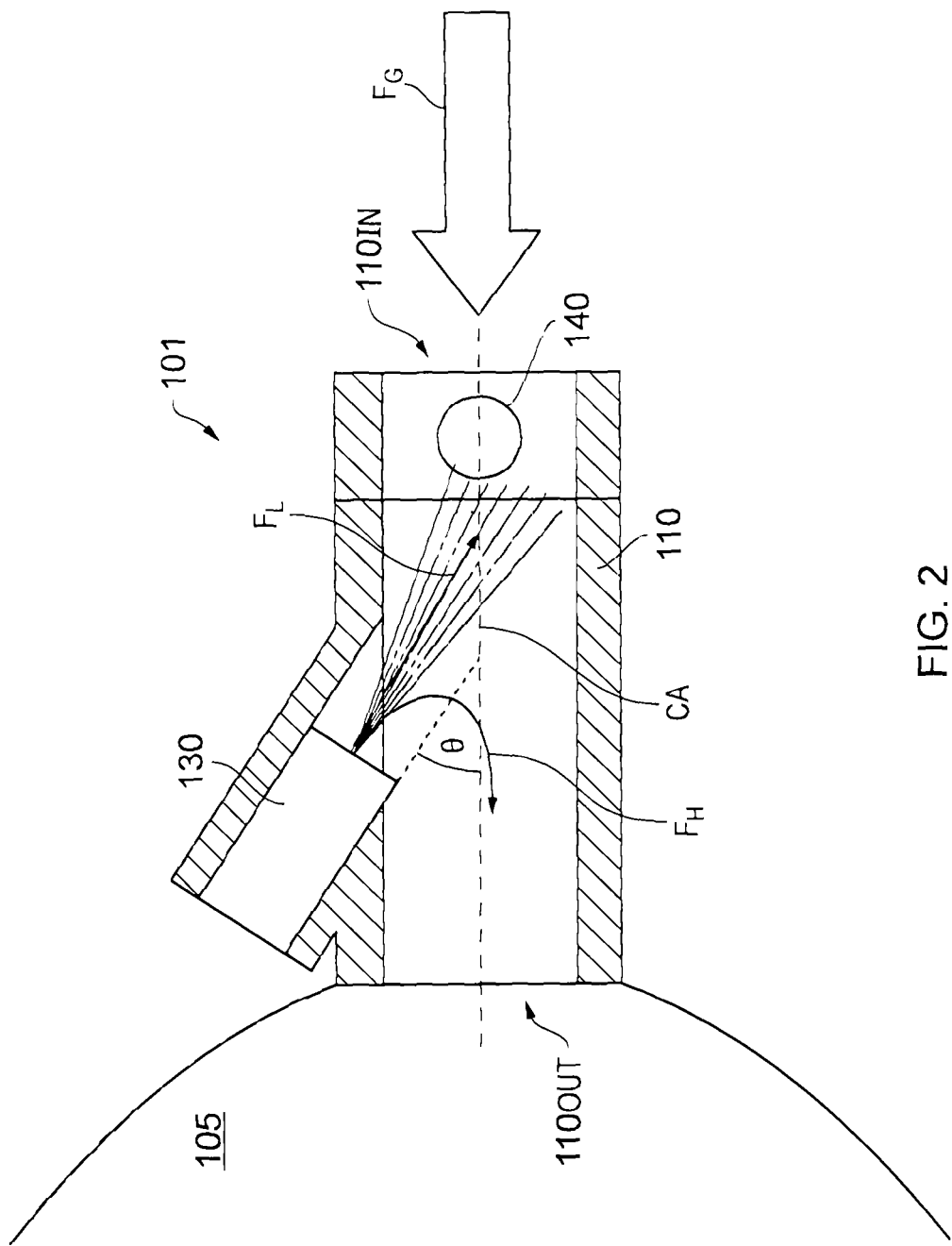
FIG. 2 is a schematic illustration of intake apparatus according to an embodiment of the present invention.

FIG. 2 shows intake apparatus 101 according to an embodiment of the present invention coupled to an engine 105.

The intake apparatus 101 has a conduit 110 through which intake gas may flow from an inlet aperture 110IN at a first end of the conduit 110 to an outlet aperture 110OUT at a second end opposite the first.

In the example shown the outlet aperture 110OUT is coupled directly to the engine 105 and feeds a supply of a fuel/gas mixture into the engine 105.

It is to be understood that the intake gas will typically be air in many applications although other gases are also useful such as nitrous oxide and a mixture of air and nitrous oxide. Other gases are also useful.

A heater element 140 is provided in the conduit 110 at the first end of the conduit 110. The heater element 140 is an electrically heated element arranged to heat intake gas as it flows through the conduit 110. The heater element 140 is attached to the conduit 110 and electrical conductors for supplying electrical current to the element 140 pass through a wall of the conduit 110.

In some embodiments the heater element 140 is coupled to a frame forming a heater module that may be removably inserted into the conduit and secured therein. In some embodiments this improves an ease of installation of heating means in the conduit. In some embodiments heating means such as heater element 140 is provided in the form of a module having its own section of conduit that is coupled to the intake conduit. In some embodiments this further improves an ease of assembly of a vehicle and an ease with which the heating means may be replaced.

A fuel injector 130 is provided downstream of the heater element 140 at a location between the heater element 140 and the outlet aperture 110OUT of the conduit 110.

The fuel injector 130 is arranged to inject fuel into the conduit 110 towards the heater element 140. In the embodiment shown an angle θ between a centreline of the injector 130 (being the direction in which fuel exits the injector 130) and a cylinder axis CA of the conduit 110 is around 30° as shown in FIG. 2, the centreline of the injector 130 being arranged to intersect the cylinder axis CA. Other angles and/or other arrangements are also useful.

The apparatus 101 is arranged whereby during operation at relatively low intake gas flow rates, such as those encountered whilst the engine 100 is being operated at an idle speed, fuel injected by the injector 130 flows a sufficient distance against the flow $F_G$ of intake gas to impinge upon the heater element 140 (flowpath $F_L$). Thus the fuel as well as intake gas flowing over the heater element 140 is heated.

Furthermore, the apparatus 101 is arranged whereby as the flow rate of intake gas increases, the distance travelled by fuel injected by the injector 130 towards the heater element 140 decreases until the fuel no longer impinges on the element 140. The apparatus 101 is configured such that when the engine is operating at a power setting higher than idle in normal use, such as a cruise power setting, fuel will not impinge on the heater element 140, but rather follows a flowpath such as path $F_H$ of FIG. 2.

As discussed above, it is to be understood that under certain conditions, fuel impinging on the heater element 140 can condense on the element 140. In particular when the heater element 140 is switched off, i.e. when it is not heated by electrical current, fuel impinging thereon may condense.

As noted above, fuel that condenses on the heater element 140 may become detached and entrained in the flow $F_G$ of gas through the conduit 110 in the form of relatively large droplets. This is in contrast to the relatively fine vapour droplets entrained when the fuel is injected into the flow $F_G$ by the injector 130.

The presence of relatively large droplets in the flow $F_G$ caused by detachment of condensed vapour typically results in uneven engine running. This is at least in part due to intermittent break-away of the condensed vapour droplets from the heater element 140.

It is to be understood that intermittent supply of condensed vapour droplets in this manner can frustrate fine tuning of the precise times at which injection of fuel into the conduit 110 (and therefore the engine 105) takes place. This is at least in part because fuel droplets may enter the combustion chamber at moments when it is required that no fuel enter the combustion chamber in order to achieve peak fuel consumption and/or power performance figures.

Figure 1:
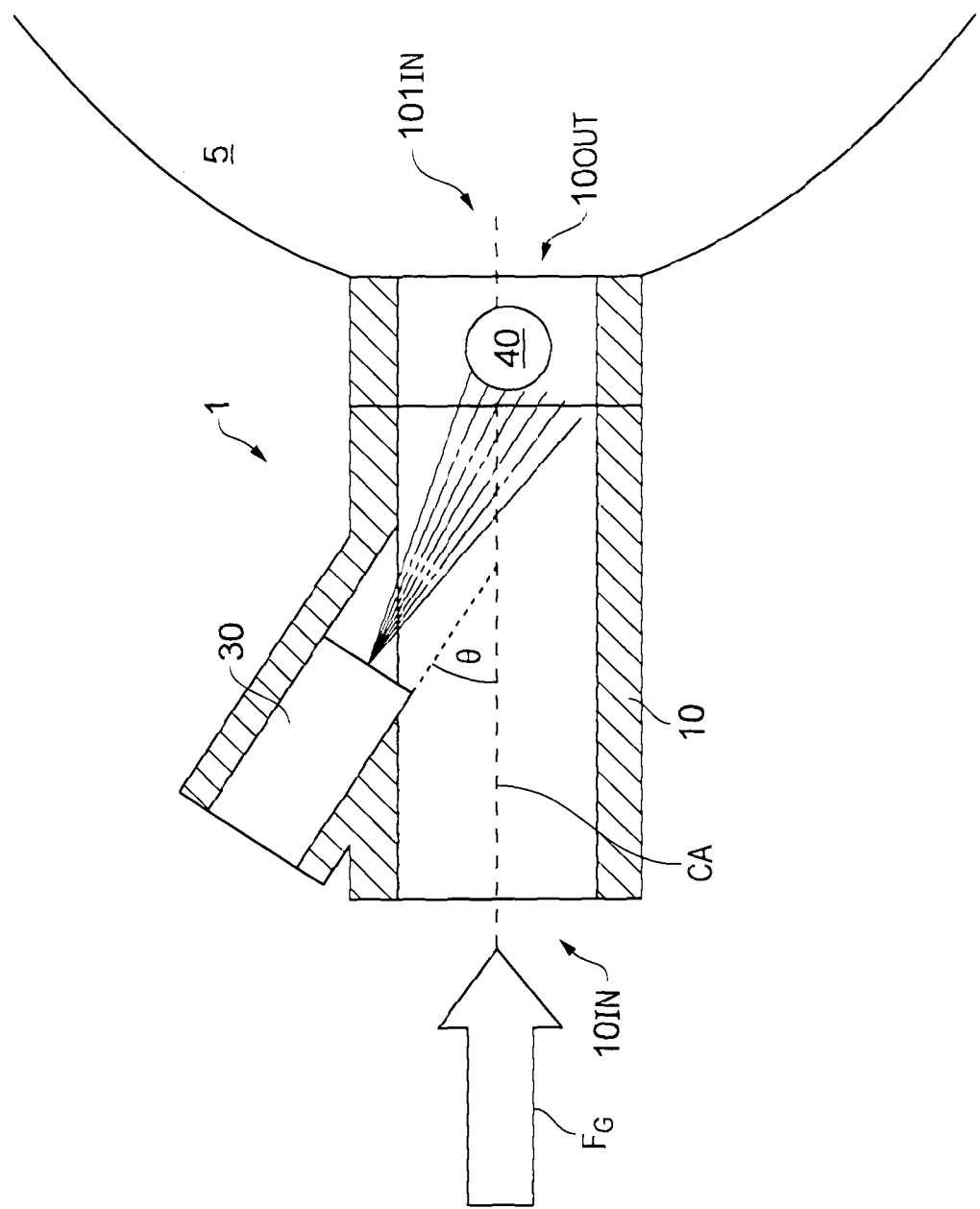
FIG. 1 is a schematic illustration of known intake apparatus for an internal combustion engine.
Figure 3:
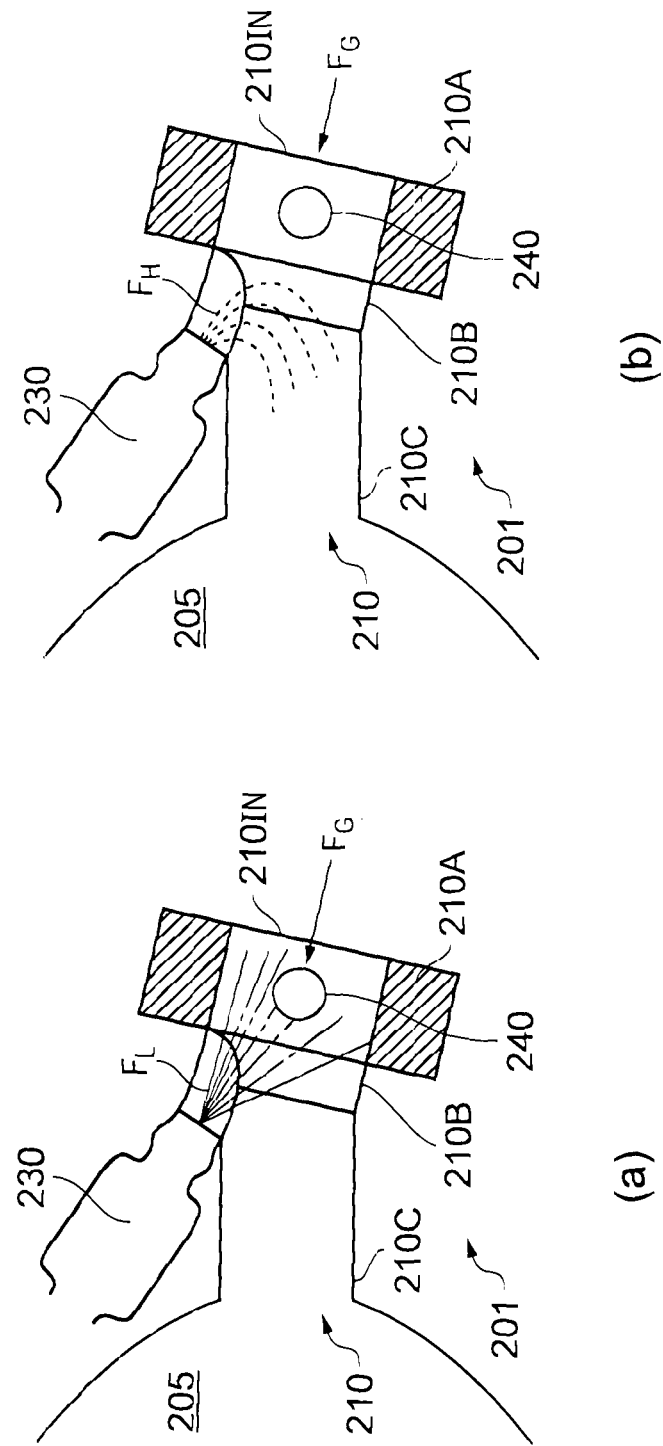
FIG. 3 is a schematic illustration of intake apparatus according to a further embodiment of the present invention when operated at (a) an intake air flow rate corresponding to an idle speed power setting of the engine and (b) an intake air flow rate corresponding to an in-use power setting of the engine being a power setting higher than the idle speed power setting.

FIG. 3 shows intake apparatus 201 according to a further embodiment of the invention arranged to deliver a flow of a gas/fuel mixture into an intake port of an engine 205. Like features of the embodiment of FIG. 2 to those of the embodiment of FIG. 1 are provided with like reference signs prefixed numeral 2 instead of numeral 1.

The apparatus 201 has a conduit 210 having three portions: a first portion 210A at an upstream end of the conduit 210, a second portion 210B downstream of the first portion 210A and a third portion 210C downstream of the second portion 210B. The first and third portions 210A, 210C are each substantially straight and their longitudinal axes are oriented at an angle of substantially 30° with respect to one another. It is to be understood that other angles are also useful in this and other embodiments. Furthermore the first portion 210A has a larger cross-sectional area than the third portion 210C.

The second portion 210B is arranged to define a bend through an angle of substantially 30° thereby to connect the first and third portions. The second portion 210B is also arranged to reduce in cross-sectional area to accommodate the difference in cross-sectional area between the first and third portions 210A, 210C. It is to be understood that a speed at which intake gas flows over the heater element 240 in the first portion of the conduit 210A is less than that at which it flows through the third portion 210C due to the larger cross-sectional area of the first portion 210A. It is to be understood that this lower speed of intake gas flow over the heater element 240 has the effect that the intake gas is heated to a higher temperature.

The fuel injector 230 is arranged to inject fuel into the second portion 210B of the conduit towards the heater element 240 in the first portion 210A. The injector 230 is arranged to inject fuel at an angle of substantially 30° with respect to a centreline of the first portion 210A.

It is to be understood that in some embodiments a centreline of the injector is arranged to intersect a middle portion of the heater element 240.

FIG. 3(*a*) shows a flowpath $F_L$ of fuel injected by the injector 230 into a flowstream of gas $F_G$ through the conduit at a relatively low intake gas flow rate. The flow rate of gas in this case corresponds to that required in order to maintain the engine 205 at a target idle speed following initial starting of the engine 205 from cold. It can be seen that the flowpath $F_L$ is such that fuel is injected by the injector 230 directly onto the heater element 240. The heater element 240 is arranged to heat gas that passes through the first portion of the conduit 210A as well as fuel that comes close to or in direct contact with it.

FIG. 3(*b*) shows a flowpath $F_H$ of fuel injected by the injector 230 in the presence of a relatively high flow rate of intake gas $F_G$ corresponding to a normal operating speed of the engine 205. In the case of an engine 205 intended for powering an aircraft the flow rate may correspond to that required to maintain normal cruise engine power or speed.

It can be seen that the flowpath $F_H$ is deflected by the flow of gas $F_G$ by an amount sufficient to prevent impingement of fuel on the heater element 240.

Embodiments of the invention have the advantage that fuel may be warmed by the heater element 240 to improve vaporisation during and immediately following initial starting of the engine 205. Once the engine has warmed, the engine speed may be increased the element 240 may be switched off.

In some embodiments apparatus according to an embodiment of the invention is arranged to provide a flow of a fuel/gas mixture to a Wankel-type rotary engine. In some embodiments the apparatus is arranged to provide a flow of a fuel/gas mixture to a piston engine. In some arrangements the apparatus is configured to provide a flow of a fuel/gas mixture to another type of engine. The engine may be an engine of an aircraft, a motor vehicle, a vessel, a power generator, optionally a range extended, or any suitable system requiring to be powered.

Figure 4:
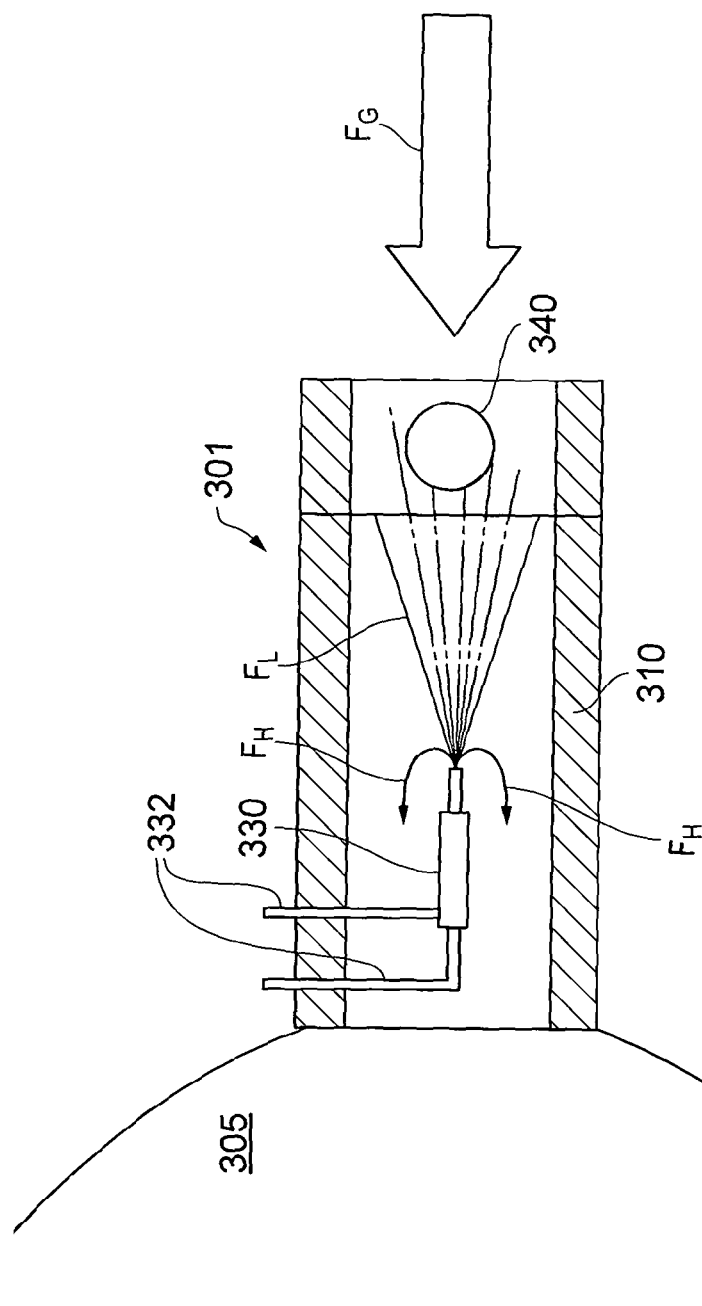
FIG. 4 is a schematic illustration of intake apparatus according to a further embodiment of the present invention.

FIG. 4 shows intake apparatus 301 according to a further embodiment of the invention. Like features of the embodiment of FIG. 4 to those of the embodiment of FIG. 2 are provided with like reference signs prefixed numeral 3 instead of numeral 1.

The apparatus 301 has a conduit 310 through which a flow of intake gas $F_G$ may pass into an engine 305. The conduit 310 has a heater element 340 past which gas passing along the conduit 310 must flow. An injector 330 is provided downstream of the heater element 340 within the flowstream of intake gas and is arranged to inject fuel into the conduit 310 towards the heater element 340. In the embodiment of FIG. 4 the injector 330 is provided substantially coaxial of the conduit 310 and is supported in the flowstream by support elements 332. One or both of the support elements 332 may be arranged to deliver a supply of fuel to the injector 330.

In a similar manner to apparatus according to the embodiments of FIGS. 2 and 3, the apparatus of FIG. 4 is arranged such that when a flow rate of intake gas $F_G$ through the conduit 310 is similar to a flow rate upon initial starting of the engine, fuel injected by the injector travels along flowpath $F_L$ a sufficient distance in a direction against the flow of intake gas that it impinges on the heater element 340 and is warmed by the heater element 340 sufficiently to assist starting of the engine 305. It is to be understood that mounting the injector 330 within the flowstream in the manner illustrated may improve a uniformity of distribution of fuel vapour in the flow of intake gas $F_G$ through the conduit 310, thereby enhancing one or more engine performance characteristics.

At higher flow rates of intake gas $F_G$ fuel injected by the injector 330 does not reach the heater element 340. Rather, a flow path $F_H$ of the fuel is deflected such that a direction of flow of fuel reverses before it reaches the heater element 340. The fuel therefore flows in the opposite direction to that in which it is injected by the injector 330, i.e. it flows in substantially the same direction as the flow of intake gas $F_G$.

Figure 5:
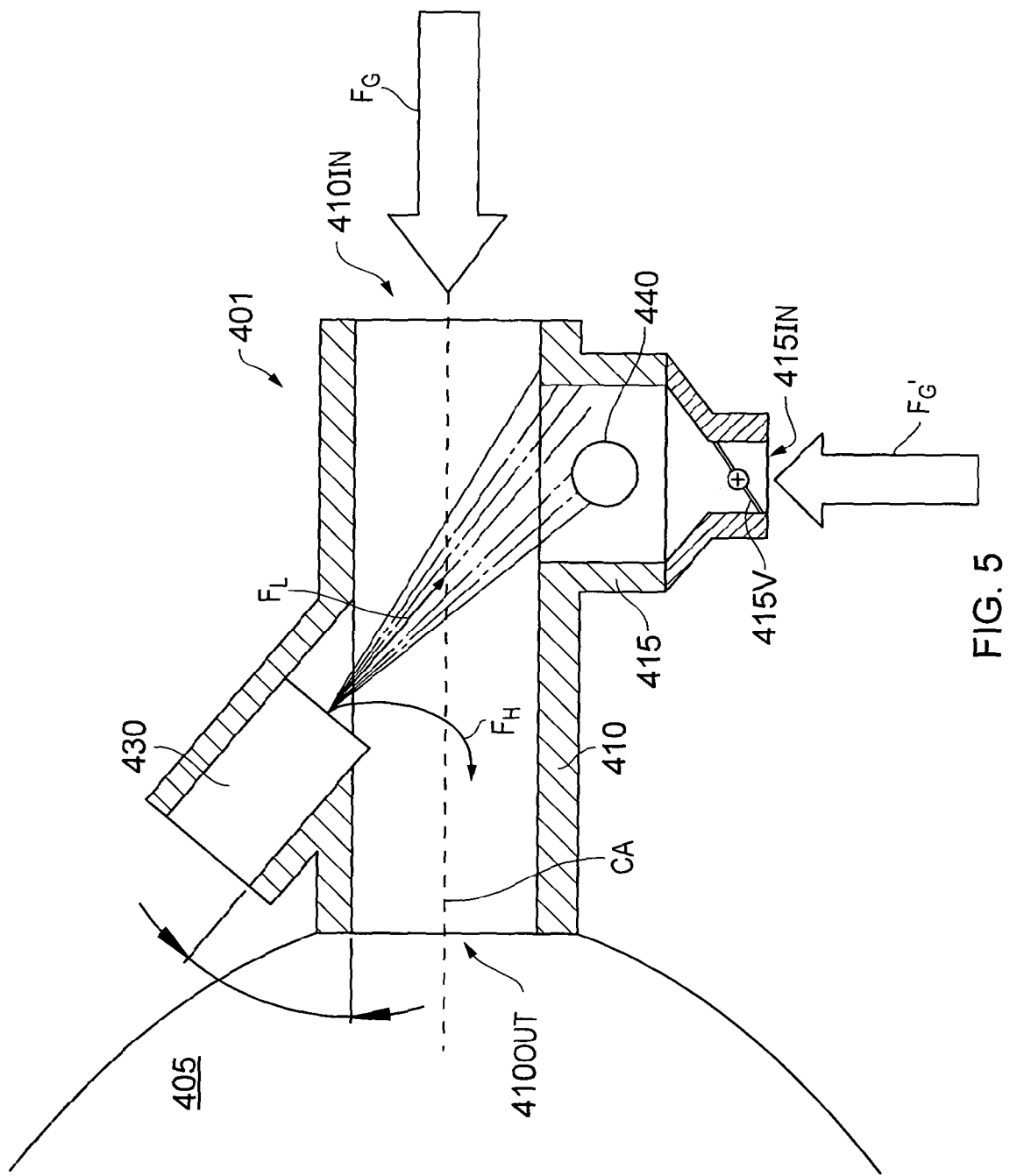
FIG. 5 is a schematic illustration of intake apparatus according to a still further embodiment of the present invention.

FIG. 5 shows intake apparatus 401 according to a further embodiment of the invention. Like features of the embodiment of FIG. 5 to those of the embodiment of FIG. 1 are provided with like reference signs prefixed numeral 4 instead of numeral 1.

The apparatus 401 is similar to that of the arrangement of FIG. 2 with regard to the orientation of the injector 430 with respect to a cylinder axis CA of a primary gas intake conduit 410 of the apparatus. That is, the injector 430 is arranged to inject fuel into the primary conduit 410 at an angle of substantially 30° to the cylinder axis CA and in a direction having a component that is against the flow of gas $F_G$ through the conduit 410. In the embodiments described herein the cylinder axis CA of the primary conduit 410 and a longitudinal axis of the injector 430 are substantially coplanar. Other arrangements are also useful.

In contrast to the embodiments of FIGS. 2 to 4, in the embodiment of FIG. 5 the heater element 440 is provided outside of the flowstream $F_G$ of gas through the primary conduit 410. The heater element 440 is provided in an auxiliary conduit 415 that is coupled to the primary conduit 410 at an angle of substantially 90°. The apparatus 401 is operable to allow a flow of auxiliary intake gas $F'_G$ through the auxiliary conduit 415 from an auxiliary gas inlet 415IN. A valve 415V is provided between the inlet 415IN and the heater element 440. The valve 415V is operable to control a flow rate of the auxiliary intake gas $F'_G$ through the auxiliary conduit 415.

The apparatus 401 is arranged wherein when it is required to start the engine 405, valve 415V is set to allow a flow of auxiliary intake gas through the auxiliary conduit 415 and therefore over the heater element 440. The heater element 440 is energised and air flowing through the auxiliary conduit 415 is heated by the element 440.

In some arrangements the apparatus 401 may also allow a flow of intake gas $F_G$ through the primary conduit 410 from primary conduit inlet 410IN during starting.

The flow rate of intake gas past the injector 430 when starting the engine 405 is arranged to be sufficiently low to allow fuel injected by the injector 430 to impinge on the heater element 440 whereupon the fuel is heated. Thus the fuel may follow a flowpath $F_L$ during starting.

However once the engine 405 has started and is sufficiently warm not to require continued heating of fuel and intake gas, the heater element 440 may be switched off. Valve 415V may be closed so as to reduce the amount of auxiliary intake gas passing along the auxiliary conduit 415, and the amount of intake gas flowing through inlet 410IN may be increased as required.

In some arrangements the valve 415V may be closed so that flow of air through the auxiliary inlet 415IN is substantially prevented.

The feature of providing the heater element 440 such that it is out of the flowstream of gas $F_G$ through the primary conduit 410 has the advantage that an amount of drag imposed on gas in the flowstream $F_G$ may be reduced. This has the advantage that a greater amount of intake gas may be passed through a conduit 410 of a given cross-sectional area. Thus the conduit 410 may be made of reduced cross-sectional area for a given value of maximum required gas flow rate through the conduit 410 compared with an arrangement in which the heater element is provided in the primary conduit 410, as in the embodiments of FIG. 2 to FIG. 4.

The apparatus 401 is arranged such that when the flow rate of gas $F_G$ through the primary conduit 410 corresponds to that required at idle engine speed during starting and warming of the engine 405 from cold, a flowpath of fuel injected by the injector 430 follows a flowpath whereby fuel does not impinge on the heater element 440, such as that shown by arrow $F_H$. Thus a risk that fuel condenses on the heater element 440 and becomes detached during engine operation when the heater element 440 is not heated is reduced.

Figure 6:
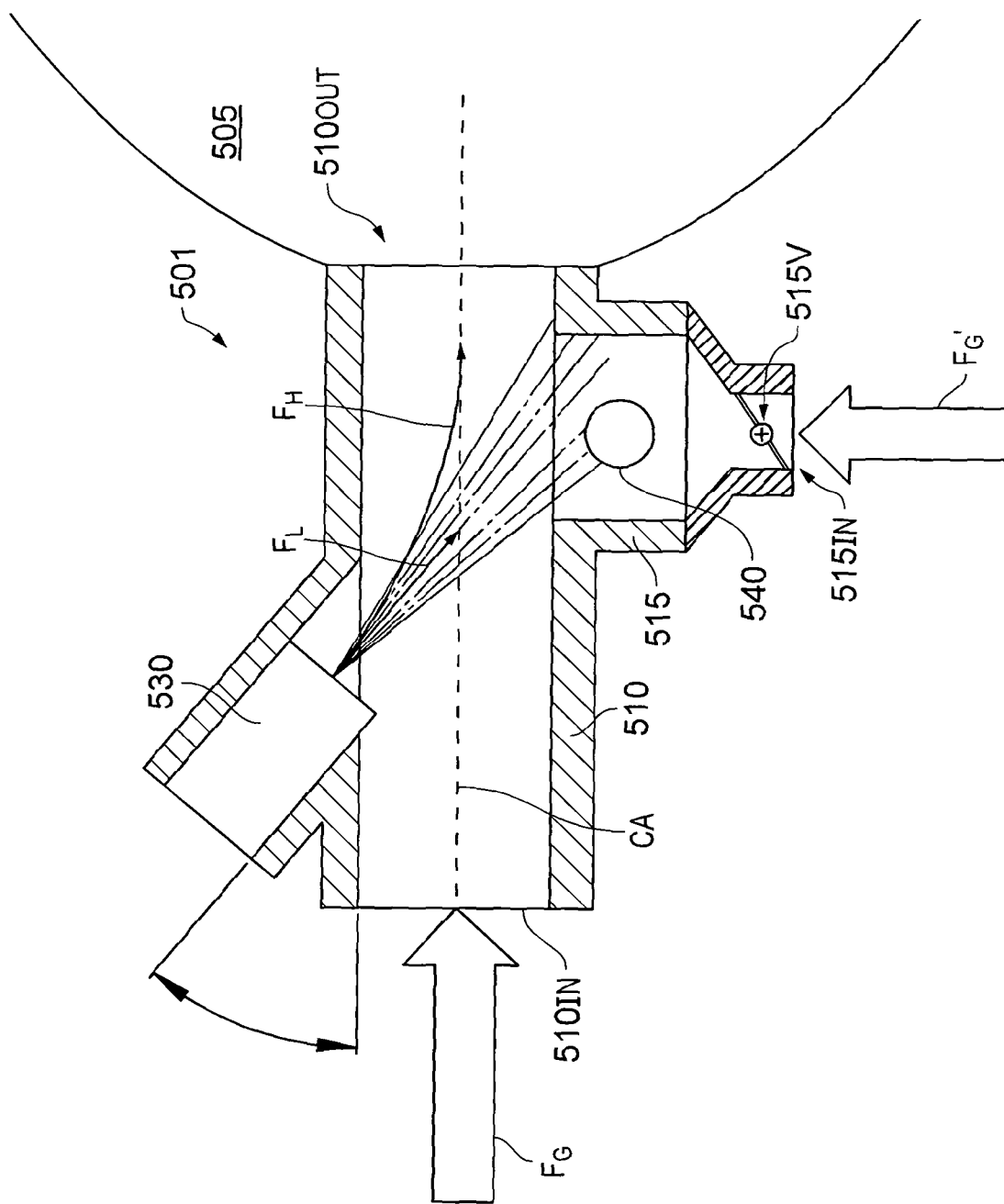
FIG. 6 is a schematic illustration of intake apparatus according to a further embodiment of the present invention.

FIG. 6 shows intake apparatus 501 according to a further embodiment of the invention. Like features of the embodiment of FIG. 6 to those of the embodiment of FIG. 5 are provided with like reference signs prefixed numeral 5 instead of numeral 4.

In the embodiment of FIG. 6 the apparatus 501 is arranged in a similar manner to the apparatus 401 of FIG. 5 except that the direction of flow of intake gas $F_G$ through the conduit 510 is the reverse of that of the embodiment of FIG. 5. Thus, fuel is injected by the injector 530 into the conduit 510 in a direction having a component parallel to and in the same direction as the flowpath of intake gas $F_G$ through the conduit 510.

The embodiment of FIG. 6 also has an auxiliary conduit 515 containing a heater element 540 and is employed in a similar manner to the conduit 415 of the embodiment of FIG. 5. A flowpath of fuel injected by the injector 530 during starting and initial warming, when the gas flowrate $F_G$ is relatively low (or zero) and during which phase auxiliary intake gas is supplied by means of the auxiliary conduit 515, is represented by trace $F_L$. The corresponding flowpath during normal operation at relatively high intake gas flow rates through the primary conduit 510 when little or no gas flows through the auxiliary conduit 515 is represented by trace $F_H$.

It can be seen that fuel following path $F_L$ impinges on heater element 540 and is therefore warmed thereby together with intake gas flowing through the auxiliary conduit 515 over the heater element 540. However at higher engine speeds the flow of intake gas through the primary conduit 510 is such that the fuel is deflected from flowpath $F_L$ in a direction downstream of the flow of gas through the primary conduit 510, following a path that may be similar to path $F_H$.

It is to be understood that in some embodiments having an auxiliary conduit 415, 515 in which the heater element 440, 540 is provided the apparatus may be operable in a manner such that when the heater element 440, 540 is not energised, a relative amount of airflow through the auxiliary and primary conduits is arranged to be such that fuel does not impinge on the heater element even when the engine is operated at a speed (such as an idle speed) corresponding to that during or shortly after starting. This is in addition to operation in a manner in which the relative airflows are such that fuel does impinge on the heater element 440, 540 when the engine is operated at idle speed during or shortly after starting. This feature has the advantage that when the engine has warmed, and the heater element is no longer required to be energised, the engine may still be operated at an idle speed without impingement of fuel on the heater element, allowing enhanced engine stability and control even at relatively low engine speeds.

It is to be understood that an amount of intake gas flowing through the primary conduit 410, 510 during starting may be substantially zero or a finite value depending on the overall configuration of the apparatus in order to obtain conditions in which fuel impinges on the heater element.

It is to be understood that a precise engine speed or power setting at which fuel impinges on the heater element may be set to correspond to any suitable speed or power setting.

In some arrangements the injector may be arranged such that it does not inject fuel therefrom in a direction directly towards the heater element. Rather the injector may be arranged to inject fuel therefrom in a direction such that during starting of the engine, when the intake gas flow rate is relatively low, fuel that is injected into the conduit follows a flowpath such that a path of the fuel is deflected by a flow of intake gas such that fuel impinges on the heater element, whilst at higher flow rates fuel is further deflected such that it no longer impinges on the heater element. In some such embodiments, if fuel is injected whilst substantially no intake gas is flowing in the conduit the fuel may not impinge on the heater element.

Embodiments of the present invention have the advantage that the problem of condensation of fuel on a heater arranged to heat fuel entrained in a flow of engine intake gas when the heater is switched off may be reduced or substantially eliminated. Embodiments of the invention are useful in a range of engine applications including rotary engines and piston engines in aeronautical, automotive and maritime applications.

Embodiments of the present invention may be understood by reference to the following numbered paragraphs:

1. Intake apparatus for an engine comprising:
   an intake conduit through which intake gas may flow into a combustion chamber of the engine;
   heating means for heating intake gas passing through the conduit; and injection means for injecting fuel into the conduit,
   the injection means being operable to inject fuel into the conduit in a direction such that when intake gas is flowing through the conduit at a first flow rate a trajectory of fuel is such that fuel impinges on the heating means and when intake gas is flowing through the conduit at a second flow rate different from the first flow rate the trajectory of fuel is modified by the flow of intake gas such that fuel does not impinge on the heating means.

2. Apparatus as described in paragraph 1 wherein the second flow rate is greater than the first flow rate.

3. Apparatus as described in paragraph 1 or paragraph 2 wherein the injection means is arranged to inject fuel into the conduit in a direction towards the heating means.

4. Apparatus as described in paragraph 1 or paragraph 2 wherein the injection means is arranged to inject fuel into the conduit in a direction upstream of the heating means and not directly towards the heating means with respect to a flow of intake gas through the conduit.

5. Apparatus as described in any preceding paragraph wherein at least a portion of the heating means is provided at a location displaced radially outwardly from the conduit.

6. Apparatus as described in paragraph 5 wherein the heating means is substantially entirely provided at a location displaced outwardly from the flowstream of intake gas through the conduit.

7. Apparatus as described in any preceding paragraph wherein the injector is arranged to inject fuel into the conduit from a location displaced outwardly from of an interior wall of the conduit.

8. Apparatus as described in any preceding paragraph wherein the heating means is provided in an auxiliary intake passage coupled to the intake conduit, the apparatus being operable to provide a flow of auxiliary intake gas through the auxiliary intake passage to the intake conduit.

9. Apparatus as described in paragraph 8 wherein the auxiliary intake passage is provided with valve means upstream of the heating means operable to control a flow rate of intake gas through the auxiliary passage.

10. Apparatus as described in any one of paragraphs 8 or 9 wherein the auxiliary intake gas comprises gas drawn from the intake conduit.

11. Apparatus as described in any one of paragraphs 8 to 10 wherein the auxiliary intake gas comprises gas drawn from an external intake gas supply.

12. Apparatus as described in any one of paragraphs 8 to 11 comprising control means operable to activate the heating means and provide a flow of auxiliary intake gas through the auxiliary intake passage when it is required to start an engine.

13. Apparatus as described in paragraph 12 wherein the control means is further operable to switch off the heating means when an engine has been started.

14. Apparatus as described in paragraph 12 or paragraph 13 wherein the control means is operable to switch off the heating means when an engine has been started and at least one further condition is met selected from the conditions that an engine has been running for a prescribed period of time following starting and an engine has achieved a prescribed operating temperature.

15. Apparatus as described in any preceding paragraph wherein the injector is arranged to inject fuel into the conduit in a direction substantially upstream of the direction of flow of intake gas.

16. Apparatus as described in any one of paragraphs 1 to 14 wherein the injector is operable to inject fuel into the conduit in a direction substantially downstream of a direction of flow of intake gas.

17. Apparatus as described in any preceding paragraph wherein the injector is arranged to inject fuel into the conduit in a direction substantially parallel to a direction of flow of intake gas.

18. Apparatus as described in any one of paragraphs 1 to 14 wherein the injector is operable to inject fuel into the conduit in a direction substantially normal to a direction of flow of intake gas.

19. Apparatus as described in any preceding paragraph wherein the heating means comprises one or more heating elements provided in a flowpath of intake gas through the conduit.

20. Apparatus as described in paragraph 19 wherein the heating means comprises a plurality of heating elements provided in the flowpath of intake gas.

21. Apparatus as described in any preceding paragraph wherein the injection means is operable to inject fuel into the conduit in a direction such that when intake gas is flowing through the conduit at a rate less than or substantially equal to the first flow rate the fuel impinges upon at least a portion of the heating means.

22. Apparatus as described in any preceding paragraph wherein the injection means is operable to inject fuel into the conduit in a direction such that when intake gas is flowing through the conduit at a rate greater than or substantially equal to the second flow rate the fuel does not impinge upon the heating means.

23. An engine comprising intake apparatus as described in any preceding paragraph.

24. A method of delivering a fuel and intake gas to an engine comprising:
passing a flow of gas along an intake conduit into a combustion chamber of an engine;
injecting fuel into the conduit by means of injection means whereby when intake gas is flowing through the conduit at a first flow rate a trajectory of fuel is such that fuel impinges on the heating means and when intake gas is flowing through the conduit at a second flow rate different from the first flow rate the trajectory of fuel is modified by the flow of intake gas such that fuel does not impinge on the heating means.

25. A method as described in paragraph 24 comprising the step of heating by means of the heating means fuel and gas flowing therepast when intake gas flows through the conduit at the first flow rate.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An intake apparatus for an engine comprising:
an injector in fluid communication with the intake apparatus configured to inject fuel into a flow stream of intake gas through the apparatus; and
a heater configured to heat gas passing through the apparatus,
wherein the injector injects fuel into the flow stream of intake gas both at starting and during normal operation such that (i) when intake gas flows through a primary intake path of the apparatus at a first flow rate, injected fuel from the injector impinges on the heater and (ii) when intake gas flows through the primary intake path of the apparatus at a second flow rate greater than the first flow rate, a trajectory of injected fuel from the injector in the flow stream is modified in response to contact with the flow stream of intake gas to be deflected by intake gas such that substantially no fuel impinges on the heater,
wherein the injector is operable to inject fuel into the flow stream of intake gas through an intake conduit of the apparatus against a flow direction of the flow stream of the intake gas with sufficient injection force to cause the injected fuel to travel upstream of the injection nozzle when the flow stream of intake gas is at the first flow rate.

2. The apparatus of claim 1, wherein the heater is directly in a flowpath of intake gas that actively transports the intake gas along a longitudinally extending axis provided by an intake conduit, wherein the injector resides at an angle and is configured to inject the fuel toward the longitudinally extending axis whereby the intake gas carries the fuel through the apparatus when the engine is being started.

3. The apparatus of claim 2, wherein the heater is in the intake conduit.

4. The apparatus of claim 1, comprising a controller operable to activate the heater and provide a flow of intake gas through the apparatus when it is required to start the engine, wherein as the engine is started, the flow of intake gas flows at the first flow rate whereby fuel injected by the injector impinges on the heater.

5. The apparatus of claim 4, wherein the controller is further operable to switch off the heater after the engine has been started and while the injector continues to inject fuel and with the intake gas in the primary intake path at the second flow rate or greater.

6. The apparatus of claim 4, wherein the controller is operable to switch off the heater when the engine has been started and at least one further condition is met, wherein the at least one further condition being that the engine has been running for a prescribed period of time following starting and/or the engine has achieved a prescribed operating temperature while the injector continues to inject fuel and with the intake gas through the primary intake path at the second flow rate or greater.

7. The apparatus of claim 4, wherein the injector is operable to inject fuel into the flowstream of intake gas through an intake conduit, and wherein the controller is operable to provide a flow of auxiliary intake gas through an auxiliary intake passage coupled to the intake gas conduit when it is required to start the engine.

8. The apparatus of claim 7, wherein the controller is operable to reduce or substantially terminate flow of intake gas through the auxiliary intake passage when the engine has been started.

9. The apparatus of claim 1, wherein the injector is operable to inject fuel into the intake conduit in a direction having at least a component directed substantially wholly downstream of a direction of flow of the flow stream of intake gas, and wherein the heater resides in a fixed position inside a pocket of the intake conduit outside a primary flow path of the flow stream.

10. The apparatus of claim 1, wherein an angle defined by a centerline of the injector and a centerline of the intake conduit is about 30 degrees.

11. An intake apparatus for an engine comprising:
an injector in fluid communication with the intake apparatus configured to inject fuel into a flow stream of intake gas through the apparatus; and
a heater configured to heat gas passing through the apparatus,
wherein the injector injects fuel into the flow stream of intake gas both at starting and during normal operation such that (i) when intake gas flows through a primary intake path of the apparatus at a first flow rate, injected fuel from the injector impinges on the heater and (ii) when intake gas flows through the primary intake path of the apparatus at a second flow rate greater than the first flow rate, a trajectory of injected fuel from the injector in the flow stream is modified in response to contact with the flow stream of intake gas to be deflected by intake gas such that substantially no fuel impinges on the heater,
wherein the injector is operable to inject fuel into the intake conduit of the apparatus in an upstream direction towards the heater and against a flow direction of the flow stream of the intake gas, and wherein the heater resides a distance upstream of the injector.

12. An intake apparatus for an engine comprising:
an injector in fluid communication with the intake apparatus configured to inject fuel into a flow stream of intake gas through the apparatus; and
a heater configured to heat gas passing through the apparatus,
wherein the injector injects fuel into the flow stream of intake gas both at starting and during normal operation such that (i) when intake gas flows through a primary intake path of the apparatus at a first flow rate, injected fuel from the injector impinges on the heater and (ii) when intake gas flows through the primary intake path of the apparatus at a second flow rate greater than the first flow rate, a trajectory of injected fuel from the injector in the flow stream is modified in response to contact with the flow stream of intake gas to be deflected by intake gas such that substantially no fuel impinges on the heater,
wherein the injector is operable to inject fuel into the intake conduit in a direction against a flow direction of the intake gas through the intake conduit and not directly towards the heater.

13. An intake apparatus for an engine comprising:
an injector in fluid communication with the intake apparatus configured to inject fuel into a flow stream of intake gas through the apparatus; and
a heater configured to heat gas passing through the apparatus,
wherein the injector injects fuel into the flow stream of intake gas both at starting and during normal operation such that (i) when intake gas flows through a primary intake path of the apparatus at a first flow rate, injected fuel from the injector impinges on the heater and (ii) when intake gas flows through the primary intake path of the apparatus at a second flow rate greater than the first flow rate, a trajectory of injected fuel from the injector in the flow stream is modified in response to contact with the flow stream of intake gas to be deflected by intake gas such that substantially no fuel impinges on the heater,
wherein the heater is in an auxiliary intake passage coupled to the intake conduit, the apparatus being operable to provide a flow of intake gas through the auxiliary intake passage to the intake conduit, and wherein the auxiliary intake passage is orthogonal to the intake conduit.

14. The apparatus of claim 13, wherein the auxiliary intake passage is provided with a valve operable to control a flow rate of intake gas through the auxiliary intake passage.

15. The apparatus of claim 13, wherein the intake gas that flows through the auxiliary intake passage comprises gas from the intake conduit.

16. The apparatus of claim 13, wherein the intake gas that flows through the auxiliary intake passage comprises gas drawn from an intake gas supply not being gas from the intake conduit.

17. An intake apparatus for an engine comprising:
an injector in fluid communication with the intake apparatus configured to inject fuel into a flow stream of intake gas through the apparatus; and
a heater configured to heat gas passing through the apparatus,
wherein the injector injects fuel into the flow stream of intake gas both at starting and during normal operation such that (i) when intake gas flows through a primary intake path of the apparatus at a first flow rate, injected fuel from the injector impinges on the heater and (ii) when intake gas flows through the primary intake path of the apparatus at a second flow rate greater than the first flow rate, a trajectory of injected fuel from the injector in the flow stream is modified in response to contact with the flow stream of intake gas to be deflected by intake gas such that substantially no fuel impinges on the heater,
wherein the injector is operable to inject fuel into the intake conduit in a direction having at least a component directed substantially upstream of a direction of flow of the flow stream of intake gas a distance upstream of the injector, and wherein the heater is upstream of the injector.

18. A method of delivering a fuel and intake gas to an engine comprising:
injecting fuel into a flow stream of intake gas through an engine intake apparatus using an injector;
heating intake gas passing through the apparatus using a heater, wherein the heater is located upstream of the injector,
wherein, at start-up and during normal operation, the injecting fuel into the flow stream of intake gas is carried out using the injector so that (i) when the intake gas is flowing at a first flow rate, the injected fuel from the injector is in a direction toward the heater and impinges on the heater and (ii) when the intake gas is flowing at a second flow rate greater than the first flow rate, the injected fuel from the injector is deflected directly by contact with the flow stream of intake gas whereby the injected fuel is forced to travel in a direction away from the heater and whereby substantially no fuel impinges on the heater, wherein the injecting fuel comprises increasing a flow rate of intake gas from the first flow rate to the second flow rate after starting the engine, and wherein the injecting fuel is carried out both at start-up and during normal operation to inject fuel from the injector in an upstream direction toward the heater.

19. The method of claim 18, further comprising turning the heater off when the engine has been running for a prescribed period of time following starting and/or the engine has achieved a prescribed operating temperature while continuing to inject fuel using the injector and with the intake gas at the second flow rate or greater.

20. An intake apparatus for an engine comprising:

an injector configured to inject fuel into a flow stream of intake air past the injector through an intake conduit of the apparatus, wherein the injector injects the fuel in an upstream direction against a direction of the flow stream of the intake air with sufficient injection force to cause the injected fuel to travel upstream of the injector; and a heater configured to heat intake air passing through the apparatus, wherein the heater is upstream of the injector, wherein the apparatus being operable to inject fuel into the flow stream of intake air past the injector so that (i) when intake air flows past the injector through the intake conduit of the apparatus at a flow rate less than or equal to a first flow rate, injected fuel from the injector impinges on the heater and (ii) when intake air flows past the injector through the intake conduit of the apparatus at a flow rate greater than or equal to a second flow rate greater than the first flow rate, a trajectory of injected fuel from the injector is modified in response to contact with the flow stream of intake air to be deflected by the intake air such that substantially no fuel impinges on the heater.

21. The intake apparatus of claim 20, further comprising a controller in communication with the heater, wherein the controller is configured to turn the heater off when the engine has been running for a prescribed period of time following starting and/or the engine has achieved a prescribed operating temperature while the injector is configured to continue to inject fuel into the intake conduit and into the intake air with the intake air at the second flow rate or greater.

* * * * *

UNITED STATES PATENT AND TRADEMARK OFFICE
CERTIFICATE OF CORRECTION

PATENT NO. : 11,125,191 B2
APPLICATION NO. : 14/363187
DATED : September 21, 2021
INVENTOR(S) : Shaun Addy It is certified that error appears in the above-identified patent and that said Letters Patent is hereby corrected as shown below:

On the Title Page

Item (30) Foreign Application Priority Data: Please correct "1120970" to read -- 1120970.7 --

Signed and Sealed this
Twenty-fourth Day of May, 2022

Katherine Kelly Vidal
*Director of the United States Patent and Trademark Office*